(12) United States Patent
Chou et al.

(10) Patent No.: US 6,406,367 B1
(45) Date of Patent: Jun. 18, 2002

(54) INDOOR AIR QUALITY CONTROL

(75) Inventors: Shau-Tak Rudy Chou, Fayetteville; Robert J. Whitwell, Nedrow, both of NY (US)

(73) Assignee: Carrier Corporation, Syracuse, NY (US)

(*) Notice: Subject to any disclaimer, the term of this patent is extended or adjusted under 35 U.S.C. 154(b) by 0 days.

(21) Appl. No.: 09/755,311

(22) Filed: Dec. 26, 2000

(51) Int. Cl.[7] .................................................. F24F 7/06
(52) U.S. Cl. ...................................... 454/233; 454/229
(58) Field of Search ................................ 454/229, 233; 95/11; 96/413, 417

(56) References Cited

U.S. PATENT DOCUMENTS 5,215,498 A * 6/1993 Wong et al. ................ 454/208
6,126,540 A * 10/2000 Janu et al. .................. 454/229
6,200,555 B1 * 3/2001 Nishijima et al. ......... 424/76.1

* cited by examiner

Primary Examiner—Jiping Lu
(74) Attorney, Agent, or Firm—William White

(57) ABSTRACT

An air conditioning unit includes a control that operates in an automatic air filtration mode of operation when commanded to do so. The control, when in this mode of operation, automatically activates an air filtration system within the unit in response to the sensing of contaminants in the air surrounding the unit. The automatic activation of the air filtration system occurs in response to an unfavorable comparison of a sensed value of air quality with an allowable limit for air quality. The allowable limit for air quality may be computed as a function of time so as to reduce the air quality required during times in which the space being heated or cooled is unoccupied.

5 Claims, 2 Drawing Sheets

INDOOR AIR QUALITY CONTROL

BACKGROUND OF THE INVENTION

This invention relates to the control of an indoor air conditioning unit having an air filtration system within the unit.

Indoor air conditioning units now include various air filtration systems which filter the air passing through the units. These air filtration systems typically require that at least a fan be activated so as to circulate air through a filter which removes impurities in the air such as dust, odors, or volatile chemical compounds. The filters that remove these impurities usually require some form of activation in order to perform their respective filtering capabilities. In the case of passive filters, this may only require the activation of a fan so as to circulate air through the filter. In the case of other types of filters such as electrostatic filters and photocatalytic filters, there may be a need to activate particular filtering mechanisms.

It is desirable that any of the aforementioned filters be appropriately activated when the air quality in a room deteriorates. It is, however, not always possible to easily read the display of conditions measured by a unit so as to thereby activate air filtration. This may be especially true for an air conditioning unit mounted relatively high on a wall wherein a remote control is often used to read the conditions measured by the unit. It is also possible that an occupant of a room being heated or cooled by the air conditioning unit would not even react to poor air quality. In this regard, the occupant may be quite aware of comfort level such as temperature but not have any idea as to air quality level. Furthermore, the air filtration system may simply not be activated when the room or space is unoccupied. While this latter situation may be appropriate for unoccupied times, there will nonetheless be a period of time before the quality of air is brought to within allowable limits following occupancy and activation of the air filtration system within the unit.

SUMMARY OF THE INVENTION

The present invention provides an air conditioning unit with an air filtration system that is automatically activated any time of the day or night when the measured air quality in a space drops below permissible limits. The around-the-clock air filtration capability is preferably an automatic mode of operation which may be selected when programming the operation of the unit. The air filtration system includes an air contaminant sensor preferably mounted within the unit in such a manner so as to be able to sense the air surrounding the unit. The air contaminant sensor is connected to a microprocessor control that has been programmed to periodically read the sensor so as to determine whether the air quality in the room has dropped to a level requiring the activation of one or more air filters in the unit. The thus activated air filters remain on until such time as the sensed contaminant level has reached a point where the air quality level is acceptable.

BRIEF DESCRIPTION OF THE DRAWINGS

For a fuller understanding of the present invention, reference should now be made to the following detailed description taken in conjunction with the accompanying drawings wherein.

DESCRIPTION OF THE PREFERRED EMBODIMENTS

Figure 1:
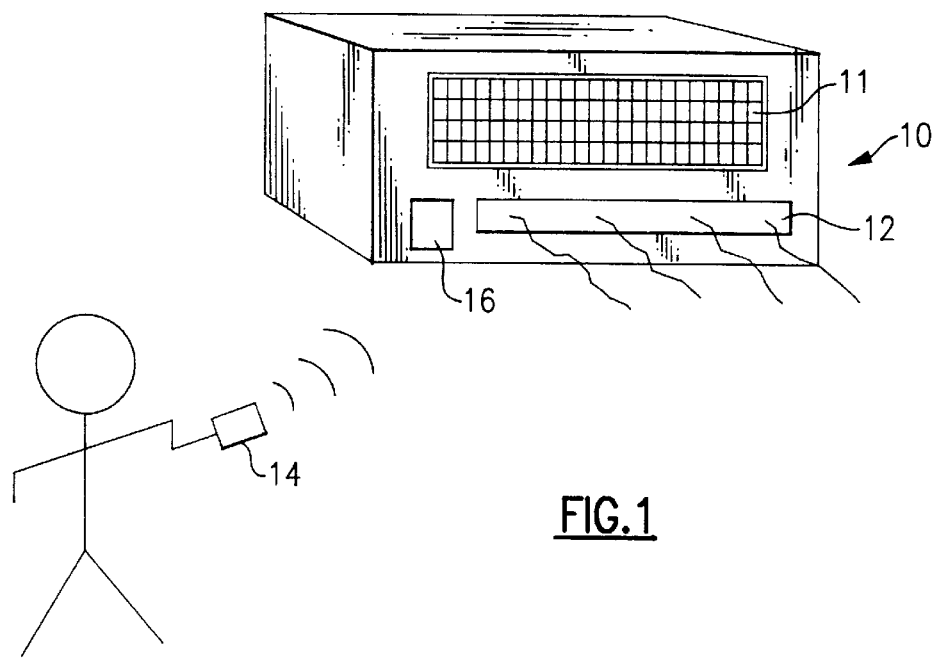
FIG. 1 illustrates an indoor air conditioning unit which provides either heated or cooled air to a space in which the unit is mounted.

Referring to FIG. 1, an air conditioning unit 10 is seen to include an inlet 11 and an outlet 12 wherein air is brought in through the intake 11 and processed before exiting at the outlet 12. The air may be filtered before exiting at the outlet 12 or it may be filtered in conjunction with being heated or cooled by the unit. It is to be appreciated that the air conditioning unit 10 may be a so called hi-wall unit mounted high on a wall within a room that is to be heated or cooled. Such units normally include a remote control 14 that is selectively activated by a person so as to communicate with a receiver 16 on the unit.

Figure 2:
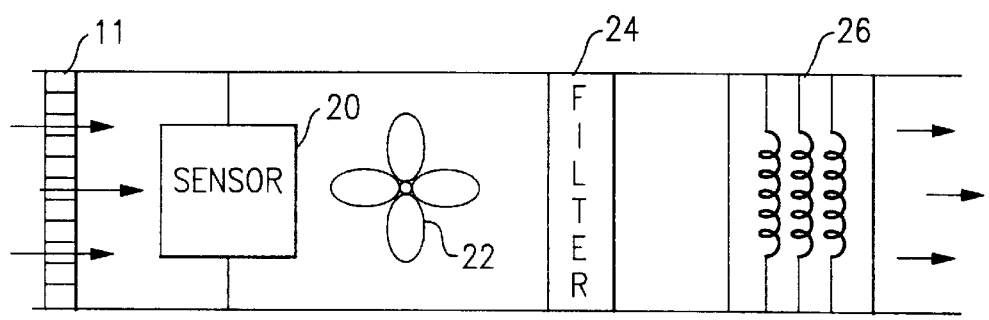
FIG. 2 illustrates an air filter located within the air flow path of the unit in FIG. 1.

Referring now to FIG. 2, an air contaminant sensor 20 is illustrated as being mounted near the air intake 11 of the air conditioning unit so as to thereby sense the degree or amount of contaminants in the air surrounding the unit. It is to be appreciated that the sensor may be mounted elsewhere either inside or outside of the unit 10. The mounting must however be such as to assure that the sensor 20 measures contaminants present in the air that can be processed by the unit 10. The air contaminant sensor may furthermore be any of a number of different types of sensors that measure anything from dust to other types of contaminants including odors or volatile chemical compounds.

A fan 22 causes air to flow through an air filter 24 where it is filtered before being heated or cooled by coils such as 26 if heating or cooling is required. It is to be appreciated that the air filter 24 may be passive and not require any particular activation in order to filter the air. On the other hand, it may be a type of filter that requires specific activation. This would be true of certain types of electrostatic filters or photo catalytic filters.

Figure 3:
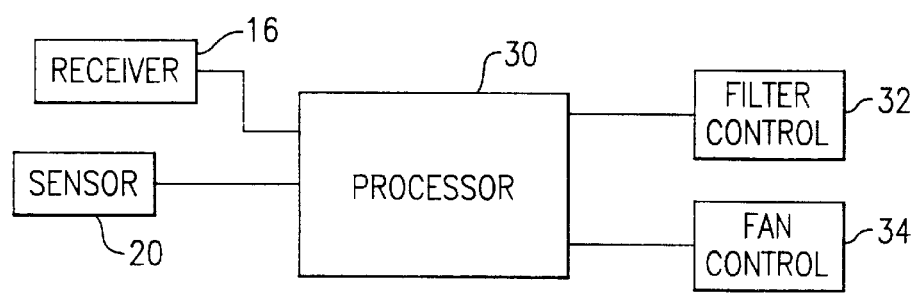
FIG. 3 is a block diagram of a microprocessor control system within the unit of FIG. 1 that is connected to the filter of FIG. 2.

Referring now to FIG. 3, a processor 30 is illustrated as being connected to the receiver 16 and the contaminant sensor 20. The processor is operative to send appropriate signals to a filter control 32 or a fan control 34 as may be required. In particular, the processor will be responsive to a particular mode selection received from the receiver 16 so as to thereafter analyze sensed measurements of contaminants in the air from the sensor 20. The processor will activate the fan control 34 and if necessary the filter control 32 when the sensed measurements indicate that the same is required.

Figure 4:
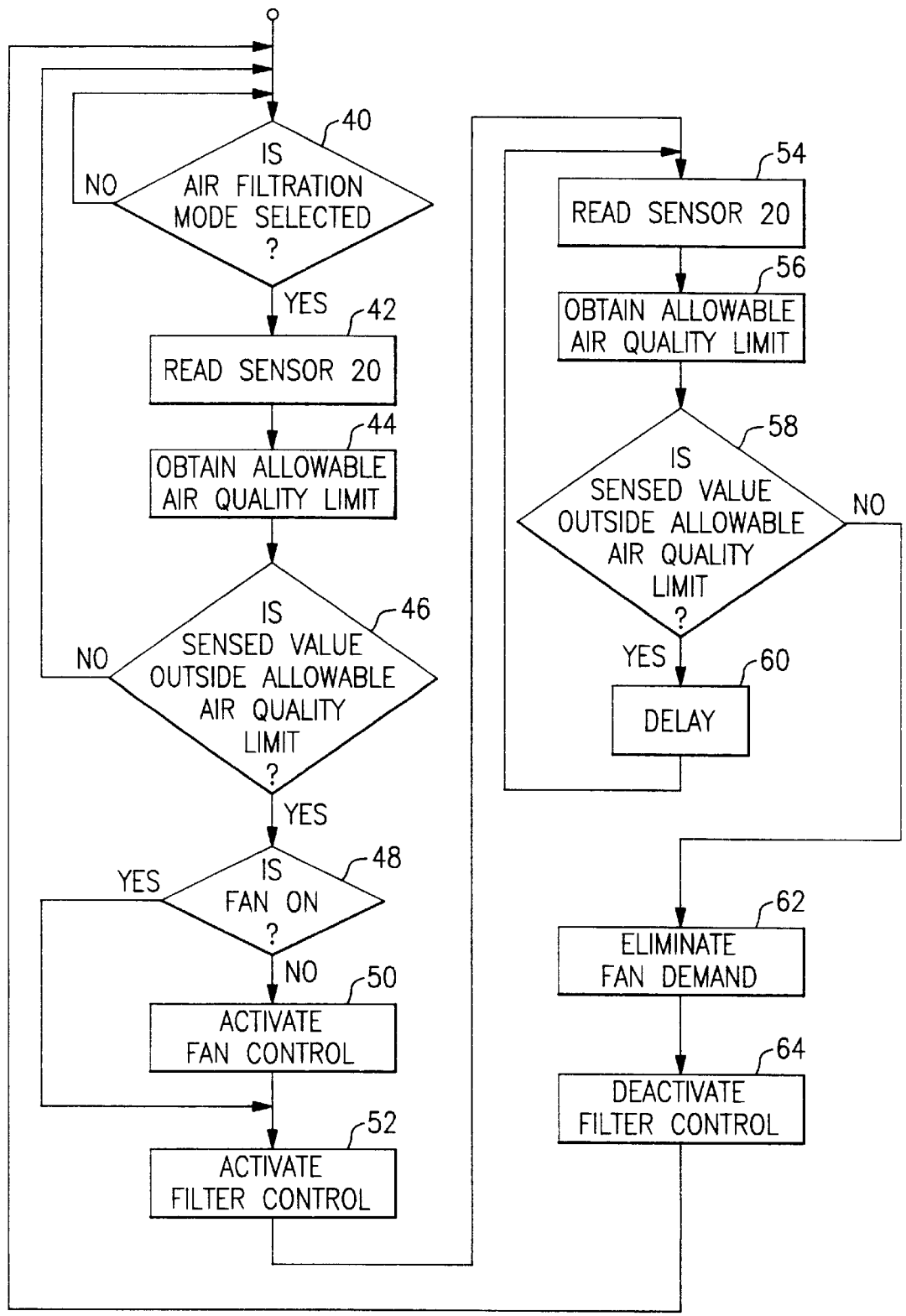
FIG. 4 is a flow chart of the process used by the processor of FIG. 3 so as to activate the filter of FIG. 2.

Referring now to FIG. 4, a flow chart of the process executed by the processor 30 so as to send appropriate control signals to the fan control 34 and the filter control 32 is illustrated. The process begins with a step 40 wherein the processor inquires as to whether an automatic air filtration mode has been selected. It will be remembered that the processor 30 receives communications from the remote control 14 via the receiver 16. In the event that the automatic air filtration mode has been selected by a person operating the remote control 14, then the processor will proceed out of step 40 along the yes path to a step 42. The processor will read the air contaminant sensor 20 in a step 42. As has been previously noted, the air contaminant sensor can be any of a variety of sensors including a dust sensor or a more sophisticated sensor that detects other types of impurities in the air that may need to be filtered. In any event, the air contaminant sensor will produce a value that can be compared with an allowable or acceptable limit for the particular sensed value. This allowable limit is obtained by the processor in a step 44. This limit may be a constant or a limit that varies with time. In the latter case, the processor will read the current time from a system clock associated with the processor and compute the allowable limit. The computation can itself be either a table look up of allowable air quality limits with respect to time or it may be an algorithmic formula. In any event, the processor proceeds from having obtained the allowable air quality limit in step 44 to step 46. The processor inquires in step 46 as to whether the measured air quality as sensed in step 42 is outside the allowable limit obtained in step 44. In the event that the sensed or measurement of contaminants is within allowable limits, then the microprocessor will proceed along the no path back to step 40.

Assuming however that the sensed measurement of contaminants is outside the allowable limit, then the processor will proceed out of step 46 to a step 48 and inquire as to whether the fan 22 is on. This will merely be a check of the fan control 34 to ascertain whether the fan is in fact on. In the event that the fan is not on, then the processor will proceed to step 50 and activate the fan control 34.

The processor will next proceed in a step 52 to activate the filter control 34 if the filter 24 within the unit requires such an activation. If the filter 24 does not require activation, then step 52 will not be necessary. Assuming however that the filter does require activation, than the processor 30 will do so in step 52. For example, if the filter 24 is an electrostatic filter requiring the application of voltage thereto then the processor in step 52 will send a signal to the filter control 24 asking the filter control to apply the voltage to the electrostatic filter. The electrostatic filter will thereafter attract and filter contaminants such as dust in the air. On the other hand, if the filter 24 is for instance a photo catalytic type of filter requiring the activation of ultraviolet lamps, then the lamps and associated filter apparatus will be activated by the filter control 24 in response to the command from the processor 30 in step 52.

The processor proceeds from step 52 to again read the air contaminant sensor 20 in a step 54 before obtaining the allowable air quality limit in step 56. The allowable limit may in fact change during the time that commanded air filtering is occurring. In this latter case, the allowable limit will be computed each time the processor executes step 56. In any event, the processor proceeds to step 58 and determines whether the measured air quality is outside the allowable limit. In the event that air quality remains outside the allowable, the processor will proceed to step 60 wherein a time delay is introduced before returning to step 54. It is to be appreciated that the time delay will be chosen so as to allow for a sufficient amount of time to elapse where air filtration can occur before reading the contaminant sensor 20 again in step 54. The processor will again read the sensor 20 in step 54, obtain the allowable limit in step 56 and thereafter determine whether air quality is outside the allowable limit in step 58. Assuming that at some point in time the air filtration by the filter 24 will produce acceptable air quality, then the processor will proceed along the no path out of step 58 to a step 62 and eliminate fan demand required by the process of FIG. 4. It is to be appreciated that the elimination of fan demand by the process of FIG. 4 will not necessarily deactivate the fan 22. In this regard, if there are other control requirements on the fan 22, then elimination of fan demand in step 62 will not affect such other requirements. The processor proceeds from step 62 to step 64 and deactivates the filter control 32. Any positive activation of any control associated with a particular filter 24 requiring activation will be turned off in step 64 in much the same manner as it was previously activated in step 52. The processor proceeds from step 64 back to step 40 wherein the process of FIG. 4 will again be implemented as long as the automatic air filtration mode remains selected.

It is to be appreciated that a preferred embodiment for an automatically activated indoor air filtration system within an air conditioning unit has been disclosed. The automatic mode of operation occurs independently of any other operations that may be required of the air conditioning unit such as heating or cooling. Alterations and modifications to the thus disclosed system may occur without departing from the scope of the invention. Accordingly, the foregoing description of the preferred embodiment is to be limited only by the following claims and equivalents thereto.

What is claimed is:

1. An air filtration system within an air conditioning unit, said system comprising:

a sensor for sensing contaminants in the air in the space being heated or cooled by the air conditioning unit;

an air filter within the air conditioning unit;

a fan for moving air through the air filter within the air conditioning unit;

a receiver for receiving control information for the air conditioning unit wherein the control information includes a selection of the operating modes of the air conditioning unit;

a processor operative to note when the control information received by said receiver includes a command for an automatic air filtration mode of operation, whereby the processor is thereafter responsive to the sensor so as to activate the fan to move air through the filter at any time of day or night as long as the command for an automatic air filtration mode of operation is noted as having been received from the receiver.

2. The air filtration system of claim 1 wherein said air filter includes an air filter control and wherein said processor is operative in response to said sensor to turn on the air filter control so as to electronically activate the air filter.

3. An air filtration system within an air conditioning unit, said system comprising:

a sensor for sensing contaminants in the air in the space being heated or cooled by the air conditioning unit;

an air filter within the air conditioning unit;

a fan for moving air through the air filter within the air conditioning unit; and a processor responsive to the sensor so as to activate the fan to move air through the filter at any time of day or night when said processor is in an automatic air filtration mode of operation wherein said processor is operative to read the sensor and compare a read value from the sensor with a stored indoor air quality limit, said processor being furthermore operative to activate the fan to move air through the filter when the read value from the sensor meets or exceeds the stored indoor air quality limit and wherein the stored indoor air quality limit varies with time and wherein said processor is operative to compute the air quality limit before comparing the read value from the sensor with the computed air quality limit.

4. The air filtration system of claim 3 wherein said processor is operative to periodically read the sensor following the activation of the fan and compute the air quality limit and compare the read value from the sensor with the computed air quality limit.

5. An air filtration system within an air conditioning unit, said system comprising:
- a sensor for sensing contaminants in the air in the space being heated or cooled by the air conditioning unit;
- an air filter within the air conditioning unit;
- a fan for moving air through the air filter within the air conditioning unit; and
- a processor responsive to the sensor so as to activate the fan to move air through the filter at any time of day or night when said processor is in an automatic air filtration mode of operation wherein said processor is operative to read the sensor and compare a read value from the sensor with a stored indoor air quality limit, said processor being furthermore operative to activate the fan to move air through the filter when the read value from the sensor meets or exceeds the stored indoor air quality limit and wherein said processor is operative to periodically read the sensor following the activation of the fan and compare the read value with the stored indoor air quality limit and to send a signal to the fan control indicating when the sensed value from the sensor meets or exceeds the stored air quality limit.

* * * * *